Oct. 30, 1962   L. N. ZINK ET AL   3,061,480
METHOD OF REMOVING SNOW
Filed Feb. 20, 1959
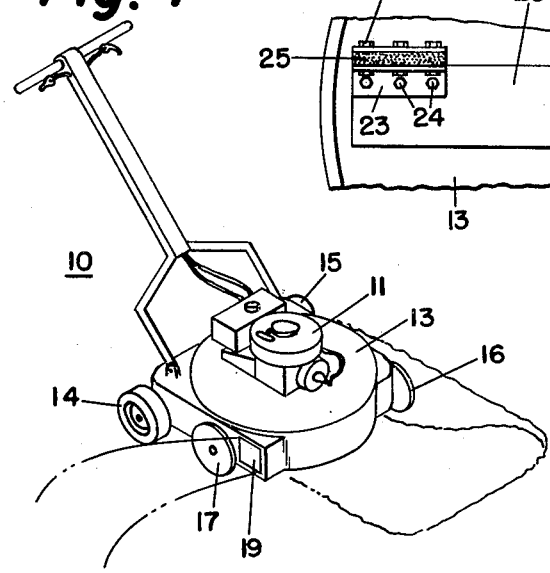
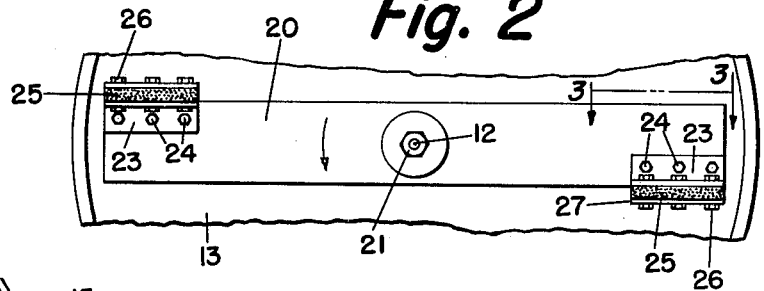
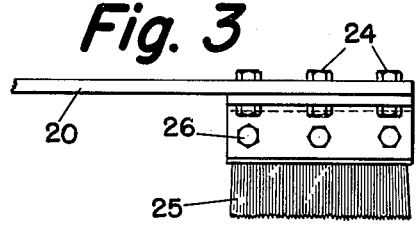
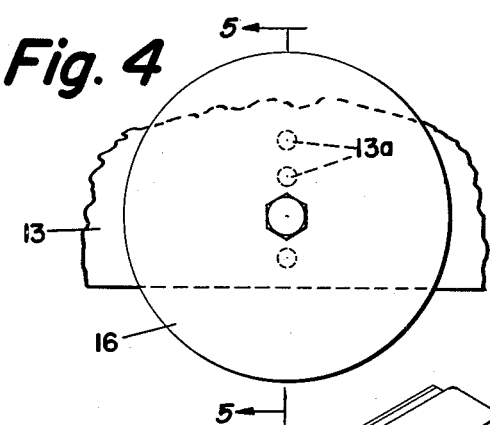
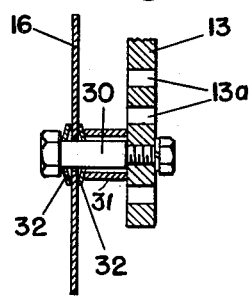
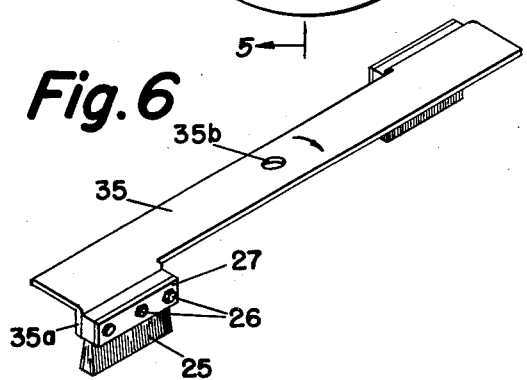
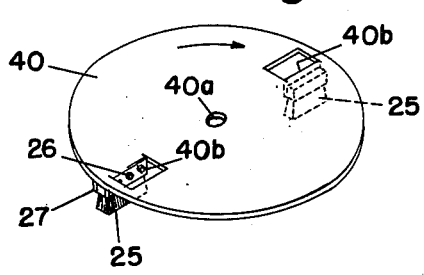

3,061,480
Patented Oct. 30, 1962

3,061,480
METHOD OF REMOVING SNOW
Leonard N. Zink, 8201 Rugby St., and Allan C. Tunick, 7612 Thouron Ave., both of Philadelphia, Pa.
Filed Feb. 20, 1959, Ser. No. 794,547
1 Claim. (Cl. 134—6)

This invention relates to the method of removing snow.

The preferred structure for carrying out the method of snow removal comprises a snow remover attachment for a rotary power mower of the type having a cutting blade mounted on a vertical power shaft supported by a housing which in turn is supported by a plurality of wheels. A support member is adapted to be secured to the shaft in place of the cutting blade for rotation within the housing. The support member has secured thereto at the opposite ends and sides thereof brush members which are adapted to sweep snow from beneath the housing. In order that the mower will penetrate the crust which forms on the surface of the snow or snow of substantial depth, the front wheels of the mower are replaced by cutting members of relatively thin gauge material. The cutting members are adapted to penetrate the surface of the snow in advance of the rotary brush members thereby permitting the mower to be lowered into the snow as the uppermost layer of snow is successively removed by the brush members. The cutting members preferably are in the form of sheet metal disc-like members having a diameter corresponding to the diameter of the normal front wheels of the mower. The normal front wheels on a lawn mower are relatively wide and usually rubber-tired in order to prevent the wheels from digging into the turf when cutting grass. Such rubber-tired wheels are not capable of penetrating the hard crust which forms on the surface of the snow and thus tend to support the unit on top of the snow. By replacing the front wheels of the mower with the relatively thin gauge disc-like members of the present invention such disc-like members penetrate the surface of the snow as the unit advances thereby permitting the unit to be lowered into the snow as the uppermost layer of snow is removed by the brush members.

For a further understanding of the invention and a more detailed description thereof, reference is to be had to the following description and the accompanying drawings in which:

FIG. 1 is a perspective view of a rotary snow remover embodying the present invention;

FIG. 2 is a fractional bottom plan view of the rotary snow remover as shown in FIG. 1;

FIG. 3 is a view looking along the lines 3—3 in FIG. 2;

FIG. 4 is an elevational view of one of the front disc-like cutting members shown in FIG. 1;

FIG. 5 is a sectional view taken along the lines of 5—5 in FIG. 4; and

FIGS. 6 and 7 are modifications of the brush supporting members shown in FIGS. 2 and 3.

Referring to FIG. 1, there is illustrated a rotary power lawn mower which has been converted into a rotary snow plow or snow remover unit 10 embodying the present invention. The rotary power unit 10 is provided with a motor 11, which may be either of the gasoline or electric driven type, having a vertically disposed power shaft which is adapted to extend beneath a housing 13 which in turn is supported by a plurality of wheels 14–17. The housing 13 is provided with a conventional discharge outlet 19 and a handle for controlling the movement of the unit 10.

As may be seen in FIG. 2, the power shaft 12 of the motor 11 is provided with a support member 20 which is adapted to be secured by a nut 21 to the extension of shaft 12 for rotation therewith beneath the housing 13.

The support member 20 is secured to the shaft 12 in the same manner as the conventional grass cutting blade on a rotary power lawn mower and replaces such blade. As may be seen in FIGS. 2 and 3, the outer ends of support member 20 are provided with angle brackets 23 which depend from and are adapted to be secured to member 20 by any suitable means, such for example as bolts 24. The brackets 23 in FIGS. 2 and 3 are formed from angle iron and are attached to the opposite ends and sides of member 20 symmetrically with respect to the axis of shaft 12. Each of the brackets 23 is provided with a brush member 25 of the wire type. The brush members 25 are adapted to be attached to the depending portions of the brackets 23 by means of a plurality of bolts 26 which extend through holes in the base portion of the brushes 25 and through holes in a depending section of brackets 23. The bolts 26 also pass through a washer type pressure plate 27. It is to be understood that the brackets 23 may be secured to the brushes and the support member 20 by other suitable means, such for example as by rivets or welding.

From the foregoing it will be seen that the support 20 replaces the conventional blade on the rotary lawn mower and thus the blade will not be subjected to rusting or otherwise damaged during removal of snow during the winter period. The support 20 is adapted to rotate in the direction of the arrow as shown in FIG. 2 and the brackets 23 cooperate with the brushes 25 to provide a combined scooping and brushing action on the snow. The snow is rotated beneath the housing 13 and is thrown through the discharge outlet 19 by centrifugal force.

It will be noted in FIG. 1 that the rear wheels 14 and 15 of the snow plow 10 are the conventional rubber-tired wheels which are normally supplied on lawn mowers. These wheels 14 and 15 have substantial width so that they will not penetrate the ground when it is soft. It will be noted that the conventional front wheels of the mower have been removed and in their places there are provided thin cutting members in the form of discs 16 and 17. As may be seen in FIG. 1, the discs 16 and 17 have a diameter corresponding to that of the conventional wheels 14 and 15 normally supplied on lawn mowers. The discs 16 and 17 and their mountings are identical and, as may be seen in FIGS. 4 and 5, the disc 16 is made of relatively thin gauge material, such for example as sheet metal, hard plastic or other equivalent material. Examples of some of the suitable plastics are phenolics, reinforced polyesters and tempered polyethylene. The disc members 16 and 17 perform a double function, namely that of cutting the crust of the snow as well as a supporting function. Thus the material from which the discs 16 and 17 are formed should be sufficiently thin to permit the discs to penetrate the snow crust. However, it should be sufficiently thick to prevent the discs from being bent or broken when the discs have penetrated the snow and engage the cement or surface of the sidewalk or driveway after the snow has been removed therefrom. The thickness of the discs 16 and 17 can vary from about $\frac{1}{16}''$ to $\frac{1}{4}''$ depending upon the particular material used. It has been found that the discs 16 and 17, when formed from metal stock, such as steel, having a thickness of about $\frac{1}{16}''$ to $\frac{1}{8}''$, perform both functions satisfactorily.

As may be seen in FIG. 5, the disc 16 is supported for rotation on a shoulder bolt 30 which is adapted to extend through one of the mounting holes 13a in the housing 13. The housing 13 preferably is provided with a series of mounting holes at different elevations as shown in FIG. 4 so that the housing 13 may be raised or lowered. This arrangement permits the brushes 25 to be adjusted so that they will rotate at the proper elevation with respect to the ground or the surface engaged by the wheels 14–17.

Since the disc members 16 and 17 are much thinner than the conventional rubber-tired wheels for the mower, a spacer member 31 is placed over the bolt 30 between the housing 13 and the disc member 16. As shown in FIG. 5 spring washer members 32 preferably are disposed on either side of the disc member 16 adjacent the tubular member 31 and the head of the shoulder bolt 30.

As is the usual practice, the rotary lawn mower is kept in the basement or in the garage when it is being stored. By way of example it will be assumed that the mower 10 has been stored in the garage and, after a snowfall, it is desired to remove the snow from the driveway. To do so, the garage door is opened and the mower is brought out. The mower, having been adapted for snow removal as above described, is positioned so that its front end moves into the snow first. The disc-like members 16 and 17 cut through the crust of the snow in advance of the rotary brush members, thereby permitting the mower to be lowered into the snow as the uppermost layer is removed by the brush members 25. When the snow is relatively shallow, say for example in the order of two to four inches, the mower is rolled through the snow in the conventional manner while supported by all four of the wheel members 14–17. When the snow is of greater depth, for example four inches to twelve inches, it is generally necessary to make more than one pass with the mower. To accomplish this, the back wheels 14 and 15 rest on the ground and the handle 20 is moved downwardly so as to raise the front end of the housing 13. The leading or front disc members 16 and 17 cut through the upper surface of the snow thereby permitting the rotary brush members 25 to remove the uppermost layer of snow and project it through the outlet 19 of the housing 13. A second pass is then made over this area of snow with the unit 10 as shown in FIG. 1 and the rotary brushes 25 remove a second layer of snow, such second layer then being the uppermost layer at that area. This action may be repeated if necessary until the snow has been completely removed from the area and all of the wheels 14–17 rest on the ground. The front disc members or wheels 16 and 17 cut through the snow as the unit 10 is being advanced, thereby permitting it to be lowered into the snow as the uppermost layer is successively removed by the brush members 25. The rear wheels 14 and 15 need not be thin disc members since they are in the trailing position and will pass over the ground after it has been cleared of snow by the rotary brush members 25.

While one embodiment for carrying out the method has been described, it will be seen that the rotary support for the brush members 25 may be constructed in various ways. In the arrangement shown in FIG. 6, the rotary support 35 has been constructed from a single piece of material such as metal, plastic or equivalent having bent bracket portions 35a integral therewith for supporting the brush members 25. The center of the support 35 is provided with a hole 35b through which the shaft 12 is adapted to extend. The support 35 may be molded from any of the aforementioned plastics or hard rubber.

Another modification of the brush support is shown in FIG. 7 where the support comprises a flat sheet metal member 40, such as steel, which is circular in shape and has a hole 40a at the center thereof through which shaft 12 is adapted to extend. A plurality of tab portions 40b are formed out of the disc 40 at locations disposed around the center hole 40a and equidistant from each other to maintain balance. The tab portions 40b provide the brackets to which the brush members 25 are secured. It will be noted that the tabs 40b are bent from the disc 40 with regard to the direction of rotation of the disc 40 so that the snow being moved by the brushes 25 will not pass through the openings left in the disc 40. The circular brush support 40 by reason of its configuration provides strong construction from a relatively thin gauge material. It also provides a common support to which additional brush members 25 may be attached if desired. The support 40 and tabs 40b may also be molded from any of the aforementioned plastics or equivalent.

From the foregoing it will be seen that the present snow removal attachment is adaptable to any type rotary lawn mower merely by removing the cutting blade and replacing it with the rotary brush support and removing the conventional front wheels of the mower and replacing them with the thin disc-like members 16 and 17. The disc-like members 16 and 17 form an important part of the invention as they are adapted to penetrate the surface of the snow in advance of the rotary brush members 25, thereby permitting the mower 10 to be lowered into the snow as the uppermost layer of snow is removed by the brush members 25. After the last snowfall of the season the unit 10 is readily converted to a lawn mower by replacing the brush support 20 with a grass cutting blade and replacing the thin discs 16, 17 with the conventional rubber-tired wheels.

While the rotatable, thin disc-like members 16 and 17 are preferred, it is to be understood that other cutting members may be employed. For example, non-rotary glide members, such as half discs or equivalent which are bolted to the housing 13 in fixed position, may be utilized. The curved portion of the half disc forms the cutting and gliding surface.

It shall be understood that the invention is not limited to the specific arrangement shown and that changes and modifications may be made within the scope of the appended claim.

What is claimed is:

A method of removing snow with a rotary power snow remover of the type having a vertical power shaft supported by a housing which in turn is supported by front and back wheels, the lower end of the power shaft carrying a rotary brush device and thin cutting wheels at the normal front wheels locations, comprising the steps of resting the back wheels of the snow remover on the ground adjacent an area of snow while raising the front end of the housing and the front cutting wheels, moving the snow remover forward and lowering the front end of the housing until the front cutting wheels cut through the upper surface of the snow thereby permitting the rotary brush device to remove the uppermost layer of snow and project it from beneath the housing, making a second pass over this area of snow by further lowering the front end of the housing to cause the front cutting members to cut through a second layer of snow thereby permitting the rotary brush device to remove the second layer from the area, and making additional passes until the snow has been completely removed and all of the wheels rest on the ground.

References Cited in the file of this patent

UNITED STATES PATENTS

| | | |
|---|---|---|
| 1,588,745 | Kear et al. | June 15, 1926 |
| 2,598,952 | Weingart | June 3, 1952 |
| 2,768,453 | Adams | Oct. 30, 1956 |
| 2,836,430 | Langenbacher | May 27, 1958 |
| 2,863,162 | Draughon | Dec. 9, 1958 |
| 2,889,641 | Reckenberg | June 9, 1959 |
| 2,920,436 | Benson | Jan. 12, 1960 |